United States Patent [19]
Kanger

[11] 3,898,016
[45] Aug. 5, 1975

[54] GATE STEM STABILIZING SYSTEM

[75] Inventor: Feodor Kanger, Montreal, Canada

[73] Assignee: Dominion Engineering Works Limited, Lachine, Canada

[22] Filed: May 31, 1974

[21] Appl. No.: 474,971

[30] Foreign Application Priority Data
June 25, 1973 Canada .................................. 174829

[52] U.S. Cl. .................... 415/163; 416/500; 74/574
[51] Int. Cl.² ........................................ F01D 17/12
[58] Field of Search ........... 415/123, 163, 160, 161; 416/500; 74/574

[56] References Cited
FOREIGN PATENTS OR APPLICATIONS

| | | | |
|---|---|---|---|
| 1,290,042 | 2/1962 | France .............................. | 415/163 |
| 1,503,299 | 9/1969 | Germany ............................ | 415/163 |
| 1,196,589 | 7/1965 | Germany ............................ | 415/123 |
| 1,130,379 | 5/1962 | Germany ............................ | 415/123 |
| 694,466 | 8/1940 | Germany ............................ | 415/163 |
| 946,185 | 1/1964 | United Kingdom................. | 415/163 |
| 785,959 | 11/1957 | United Kingdom................. | 415/163 |

Primary Examiner—Henry F. Raduazo
Attorney, Agent, or Firm—R. A. Eckersley

[57] ABSTRACT

The stems that support wicket gates of hydraulic machines such as pump turbines are stablized against undesired oscillation or other vibration by applying a transverse hydraulic force against each stem to push it against one side of a supporting bushing, so as to create large frictional forces opposing rotation or vibration of the stem relative to the bushing.

7 Claims, 4 Drawing Figures

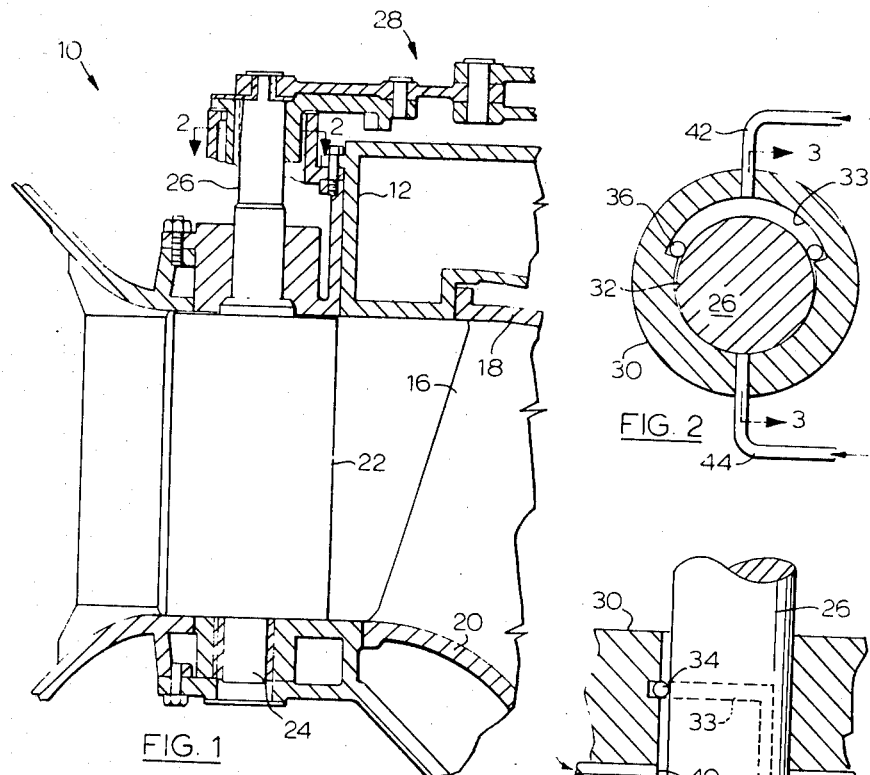
FIG. 1
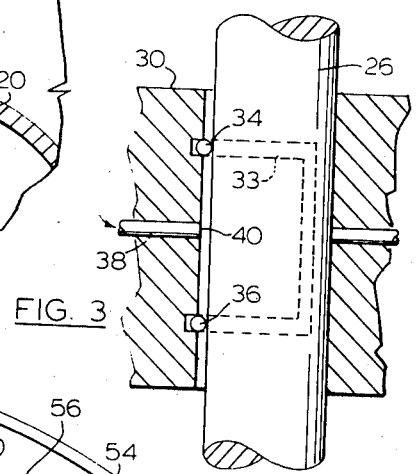
FIG. 2
FIG. 3
FIG. 4
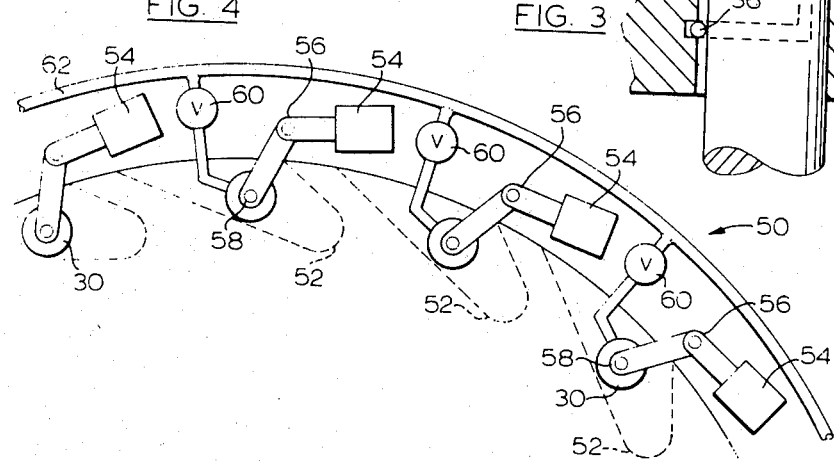

GATE STEM STABILIZING SYSTEM

This invention is directed to a gate system stabilizing system, for stabilizing the wicket gates of turbine and pump turbines against vibration and undesired oscillation, and to a wicket gate arrangement for the system.

In the operation of controlled flow hydraulic machines such as Francis turbines, and more particularly pump turbines, which machines utilize guide vanes disposed between the runner and the water speed ring, difficulty in providing quiet and reliable operation arises as the result of undesired vibration occurring at the wicket gates.

A number of complex and costly solutions have been previously provided, with a view to braking the wicket gate spindles or providing dampers for controlling the vibration of the associated gate. One such arrangement is described in Canadian Pat. No. 578,291, Boyd et al, June 23, 1959.

The present invention provides a system of applying a large restraining force transversely of a wicket gate spindle pivotally mounted in journals, to generate a large reactive force between a portion of the surface of the gate spindle and an associated journal, whereby any tendency of the spindle to move relative to the journal is resisted by a large frictional force.

The present invention is thus directed to a hydraulic machine having a plurality of guide vanes located therein for guiding liquid flowing through the machine, each said guide vane being supported by a spindle rotatably mounted in a journal, hydraulic force applying means to apply transverse force against the spindle to produce a large reactive force between the spindle and a portion of the journal, and force controlling means to apply the hydraulic force in spindle stabilizing relation, and to permit removal of the hydraulic force for unimpeded rotation of the spindle relative to the journal.

In practicing the present invention hydraulic pressure is exerted against a portion of a guide vane spindle, to produce a transverse force acting in a direction at right angles to the spindle main axis. The provision of a seal retained within a suitable machined groove at an interface between the surface of a vane spindle and a supporting journal to provide an enclosed zone at the interface, with means to admit pressure fluid such as grease, oil or suitable hydraulic fluid as a brake fluid permits the application of a large eccentric force against the spindle, to produce compression of the spindle against the journal. It is contemplated that there may be provided supplementary lubrication at the interface of spindle and journal, where the metal-to-metal contact occurs, located diametrically opposite from the fluid pressure zone so that the spindle may be freed and lubricated upon release of the applied transverse hydraulic force, to facilitate normal operation of the guide vane.

In order to ensure normal operation of the guide vanes in an unrestricted fashion under the action of the respective vane-positioning servo motors, there may be provided an interlock to cause release of the pressure of the fluid prior to operation of the respective servo motor.

Certain embodiments of the present invention are described, reference being made to the accompanying drawings, wherein:

FIG. 1 is a section through a portion of a pump turbine showing a general arrangement of a guide-vane and its mounting;

FIG. 2 is a plan section at 2—2 of FIG. 1 showing a vane stem stabilizing arrangement according to the present invention;

FIG. 3 is a view at 3—3 of FIG. 2; and

FIG. 4 is a general plan view showing a modulated control system embodying the present invention in a turbine.

Referring first to FIG. 1, the arrangement 10 shows a portion 12 of the machine head cover having a runner mounted therein. A portion 16 of a runner blade is shown mounted between an upper shroud 18 and a lower shroud 20.

A guide vane 22 has a lower spindle portion 24 and an upper spindle portion 26 by which the vane 22 is pivotally mounted in the machine. A linkage 28 connects the upper spindle with a servo mechanism, (not shown) by means of which the guide vane 22 can be controllably positioned, in accordance with the desired function of the machine.

The stem stabilizing system of the present invention which is more particularly illustrated in FIGS. 2 and 3, may be provided at any suitable portion of the spindle, either the upper portion 26, as illustrated, or in cooperation with the lower spindle portion 24, or with both upper and lower spindle portions. Referring to FIGS. 2 and 3, the spindle 26 is supported by a journal 30 having walls 32 defining a clearance bore in which the spindle 26 is retained.

A groove 33 of suitable cross-section 34 defines an area bonded by seal 36.

A bore 38 has an outlet 40 within the confines of the rectangle bounded by seal 36, to admit pressurized grease or other suitable fluid from pipe 42. The seal 36 seals off the circumscribed area to provide a force application pressure zone at the bore-spindle interface.

Upon the admission of the pressurizing fluid at outlet 40, the spindle 26 is forced laterally into close pressing relation with the opposing portion of wall 32. The use of fluid pressure, usually in the range 1000–3000 psi, generates a large transversely acting hydraulic force, which presses the spindle against the opposing journal bore wall and produces a large reactive force between the opposed contacting surfaces of spindle 26 and wall 32.

This reactive force in turn produces static frictional forces acting in a torque resisting sense on the spindle 26 to resist pivotal displacement of the guide vane 22 under external influences.

Upon cessation of the braking force by the release of hydraulic pressure at the inlet 40, lubricating oil from inlet 44, if used, can assist centralization of spindle portion 26 in its journal 30, and ensure the renewal of any oil film displaced due to transverse reaction forces operating between the surfaces of journal and spindle.

Referring to FIG. 4, there is illustrated a schematic plan view of a portion of a turbine 50 having a plurality of guide vanes or gates 52 shown in phantom, having vane positioning servo motors 54 connected in controlling relation therewith by linkage 56.

As is customary, the linkage 56 includes a shear pin (not shown) to prevent damage to the system on the occurrence of vane jamming. The servo motors 54 drive the respective vane spindles 58 to selectively position the vanes 52.

Upon the occurrence of shear pin failure the linkage 56 becomes ineffective and the related gate becomes effectively isolated from the control of the respective servo motor 54. Operation of the related throttle control valve 60 at this time admits pressurizing fluid supplied from the header 62 to the respective journal 30, to apply graduated transverse braking force against the spindle 58, in the manner set forth above.

In addition to the foregoing enumerated advantages and the low cost and relative simplicity of the present invention, the system is also characterized by an inherent incapability of jamming. There are no active moving parts in the jacking mechanism so that upon release of the jacking pressure at the fluid outlet 40 the braking effect is substantially instantaneously released, leaving the wicket gate free to turn under the action of the gate positioning servomechanism.

The use of removable spindle journals having the seal grooves recessed into the surfaces thereof permits ready servicing of the arrangement. It will be understood that the seal receiving grooves may alternatively be provided on the surface of the spindle.

The admission of pressurizing fluid may be carried out through the interior of the guide vane spindle when convenient, as in the case of an arrangement involving the lower spindle 24.

In the case of a turbine embodying the invention the energizing circuit used to pressurize the brake is fitted with a modulation system to permit selective and gradular braking application. This is of particular value in the case of failure of the shear pin linkage connecting the servo motor with the respective gate spindle. In such an instance the freed gate can be detected and trapped by braking in a controlled fashion to make possible continued operation of the machine and to minimize the likelihood of damage to the gate system.

What I claim as new and desire to secure by Letters Patent of the United States is:

1. The method of stabilizing a pivotal guide member having a spindle extending longitudinally within a bushing for pivotal rotation relative thereto comprising the steps of forming a fluid confining chamber in said bushing about a portion of the pivotal surface of said spindle and embracing a surface portion of the spindle and applying fluid pressure to said fluid confining chamber and to that portion of the spindle surface embraced by said fluid confining chamber to press the remaining surface portion of said spindle pivotal surface against the adjacent surface of the bushing to generate a major reactive force therebetween whereby any tendency to relative vibration motion between the spindle and bushing is resisted by a potentially large magnitude friction force.

2. The method as claimed in claim 1 wherein said unbalanced transverse force acting on said spindle is obtained by the localized restriction of said fluid pressure by the step of providing a zone seal subtending a limited arcuate area of said spindle, extending between at least one surface area of said bushing and the adjacent surface of said spindle in fluid pressure sealing relation therewith.

3. A spindle stabilizing system to substantially preclude undesired motion between a spindle and a surrounding bushing, comprising area seal means positioned at a peripheral interface between mating surfaces of the spindle and bushing to enclose at least one sealed space therebetween encompassing an arc of less than 180°, passage means connected with the space to transmit pressurized fluid thereto and at least one contact surface interface portion between said spindle and said bushing located substantially diametrically oppositely of said sealed space to provide reactive forces between the spindle and the bushing upon pressurization of said sealed space, to permit the creation of large frictional forces between the spindle and the bushing resisting relative sliding motion therebetween.

4. Apparatus as claimed in claim 3 wherein said spindle has a wicket gate mounted thereon.

5. The apparatus as claimed in claim 4 in combination with a hydraulic turbo machine having a plurality of said wicket gates mounted in fluid guiding relation about the runner of the machine.

6. The apparatus as claimed in claim 4 having said area seal means recessed in a groove located on a radially inner surface of a said bushing and defining an enclosed surface area bounded by a seal member located in said groove and extending radially inwardly therefrom relative to the axis of said spindle in fluid pressure sealing relation with an adjoining surface of said spindle.

7. The apparatus as claimed in claim 6 including lubrication means to supply lubricating fluid to said interface at a location peripherally removed from said sealed space.

* * * * *